(No Model.)
W. N. WHERRY.
MOLE TRAP.
No. 393,048. Patented Nov. 20, 1888.
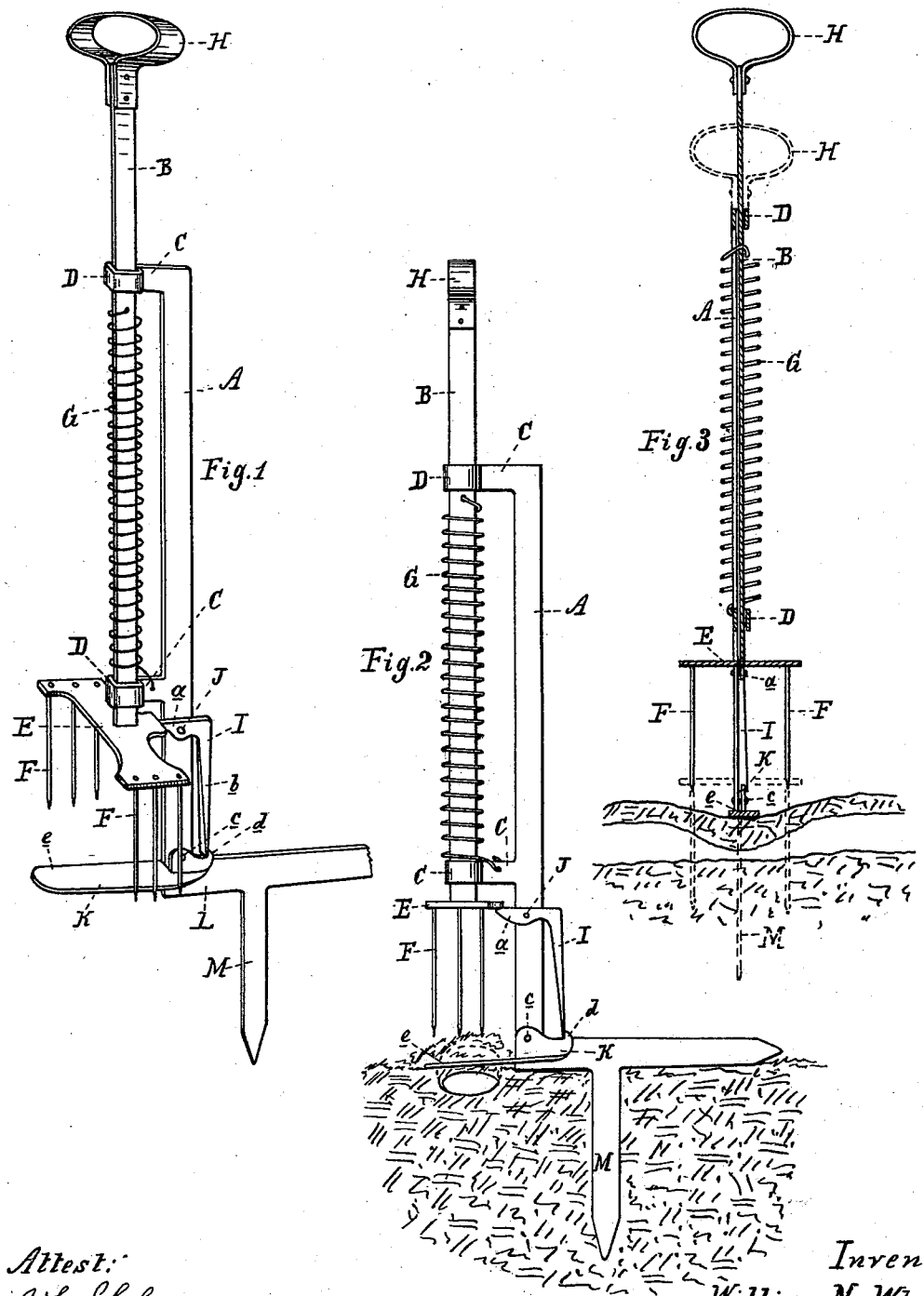
Attest:
John Schuman.
P. M. Hulbert.
Inventor:
William N. Wherry.
By Thos. S. Sprague & Son
Atty.

UNITED STATES PATENT OFFICE.

WILLIAM N. WHERRY, OF PLYMOUTH, MICHIGAN.

MOLE-TRAP.

SPECIFICATION forming part of Letters Patent No. 393,048, dated November 20, 1888.

Application filed April 13, 1888. Serial No. 270,524. (No model.)

*To all whom it may concern:*

Be it known that I, WILLIAM N. WHERRY, a citizen of the United States, residing at Plymouth, in the county of Wayne and State of Michigan, have invented certain new and useful Improvements in Mole-Traps, of which the following is a specification, reference being had therein to the accompanying drawings.

This invention relates to certain new and useful improvements in mole-traps; and the invention consists in the peculiar construction of the frame, whereby the trap may be more readily set, and in the combination and arrangement of the various parts, all as more fully hereinafter described.

In the drawings which accompany this specification, Figure 1 is a perspective view of my improved mole-trap. Fig. 2 is a side elevation, and Fig. 3 is a central vertical cross-section thereof.

A is the frame which holds the spring-actuated plunger B, by means of the lateral offsets C, in which are formed the vertical guides D, through which the plunger-rod slides. The lower end of the plunger-rod is provided with a cross-head, E, which is provided with the teeth or forks F, projecting at right angles therefrom and sharpened at their lower ends.

G is a spiral spring which encircles the plunger-rod, and is connected thereto at its upper end in any suitable manner, and has its lower end attached to the lower offset of the frame. The upper end of the plunger-rod is provided with a bail or handle, H, of any suitable shape, for raising the plunger to set the trap.

I is a bell-crank lever or detent pivotally secured at J to the frame, and in such relation to the cross-head that the arm *a* may be engaged with its end upon the under side thereof, while the other arm, *b*, extending downward to the lower end of the frame, may be engaged with the trigger K, (which is fulcrumed at *c* to the frame,) by means of the notch *d*, formed in the rear end of the trigger. The forward end, *e*, is flattened out to form a broad bearing level with the ground.

The lower end of the frame is provided with the heel L, which extends laterally some distance, and this heel is provided on its lower side with the ground-post M, which is preferably flat and pointed at its lower end.

In practice, the parts being constructed and arranged as described, the device is intended to operate as follows: Selecting a fresh path which has been made by a mole, as is evidenced by the usual raised line of earth, the operator depresses a portion of it, and then, placing the trap with the two forks across the path selected, he places his foot upon the heel of the frame and presses the ground-post M into the ground until the flat portion *e* of the trigger rests upon the depressed portion of the ground, when the detent is properly engaged with the trigger, so that when the mole in following his path raises the obstruction of earth underneath the trigger, the latter must be raised thereby, thus disengaging the detent and allowing the plunger-rod actuated by the spring to be forced down quickly, when the forks in the cross-head transfix the animal.

I am aware that mole-traps have been made which have a frame, a plunger-rod actuated by a spring, a detent, and a trigger, and I do not broadly claim such construction as my invention. My improvement consists in the construction of the frame, the lateral heel of which enables the operator to firmly brace himself in planting and setting the trap by placing one foot upon the heel; or, if he chooses, he can set the trap first and then stick it in the ground, the heel acting as a stop or guide to fix the depth to which it should enter the ground, and there being but one ground-post placed some distance laterally from the trigger, it is more readily adjusted in proper proximity to the ground, and therefore more liable to spring the trap.

What I claim as my invention is—

1. In a mole-trap, a supporting-frame consisting of a single upright provided upon one side with lateral offsets forming guides, and a lateral heel at the lower end of said upright extending in a direction opposite to the lateral offsets and provided with a ground-post to one side of the upright, substantially as and for the purpose specified.

2. In a mole-trap, the combination, with the frame A, formed with lateral offsets, and rearwardly-extended heel L, formed with the ground-post, of the plunger-rod guided by the offsets on the frame, the cross-head E on the lower end of the plunger-rod, the trigger K, fulcrumed to the frame and formed at its rear end with notch d, and the bell-crank detent pivoted to the frame and its vertical arm engaging the notch of the trigger, substantially as shown and described.

In testimony whereof I affix my signature, in presence of two witnesses, this 27th day of March, 1888.

WILLIAM N. WHERRY.

Witnesses:
 JOHN SCHUMAN,
 P. M. HULBERT.